(12) United States Patent
Kobayashi

(10) Patent No.: US 7,145,854 B2
(45) Date of Patent: Dec. 5, 2006

(54) RECORDING LAYER DETERMINATION APPARATUS FOR DETERMINING WHETHER RECORDING LAYER OF RECORDING MEDIUM IS SINGLE-LAYER OR MULTI-LAYER

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 521 days.

(21) Appl. No.: 10/191,982

(22) Filed: Jul. 9, 2002

(65) Prior Publication Data
US 2003/0012106 A1 Jan. 16, 2003

(30) Foreign Application Priority Data
Jul. 10, 2001 (JP) ............................. 2001-209937
Jul. 9, 2002 (JP) ............................. 2002-200463

(51) Int. Cl.
G11B 7/05 (2006.01)
(52) U.S. Cl. ................................ 369/53.23; 369/44.25; 369/44.27
(58) Field of Classification Search .............. 369/53.23
See application file for complete search history.

(56) References Cited

U.S. PATENT DOCUMENTS

| 5,831,953 | A | * | 11/1998 | Numata .................... 369/53.23 |
| 6,061,318 | A | * | 5/2000 | Hwang ..................... 369/53.23 |
| 6,262,957 | B1 | | 7/2001 | Inoue et al. |
| 6,278,672 | B1 | * | 8/2001 | Kobayashi ................ 369/53.23 |

FOREIGN PATENT DOCUMENTS

| JP | 10-074356 | | 3/1998 |
| JP | 10-097755 | | 4/1998 |
| JP | 10188457 | A * | 7/1998 |
| JP | 11-149640 | | 6/1999 |
| JP | 11149640 | A * | 6/1999 |
| JP | 11191264 | A * | 7/1999 |
| JP | 11-232768 | | 8/1999 |
| JP | 11-288550 | | 10/1999 |
| JP | 11353787 | A * | 12/1999 |
| JP | 2000011387 | A * | 1/2000 |
| JP | 2000-155955 | | 6/2000 |

OTHER PUBLICATIONS

English Translation of: JP 11149640 A; JP 10188457 A; JP 11191264 A; JP 11353787 A; 2000011387 A.*

* cited by examiner

*Primary Examiner*—Andrea Wellington
*Assistant Examiner*—Jorge L. Ortiz-Criado
(74) *Attorney, Agent, or Firm*—Katten Muchin Rosenman LLP

(57) ABSTRACT

An objective lens of an optical pickup is made to move from far position to near position with respect to DVD with constant speed, and a timer counts time taken for the movement of a focus of a laser beam between recording layers of the DVD on the basis of a focus error signal obtained from this movement. In the case of the DVD of the single-layer, since the recording layer is one-layer, and there is no interlayer, count value becomes small value. While, in the case of DVD of the multi-layer, the recording layer consists of a plurality of layers, thus one or plural-interlayer exists, therefore, count value becomes large value. Accordingly, if small count value is obtained, its DVD is discriminated as DVD of the single-layer. While, if large count value is obtained, its DVD is discriminated as DVD of the multi-layer.

14 Claims, 11 Drawing Sheets

PRIOR ART

PRIOR ART

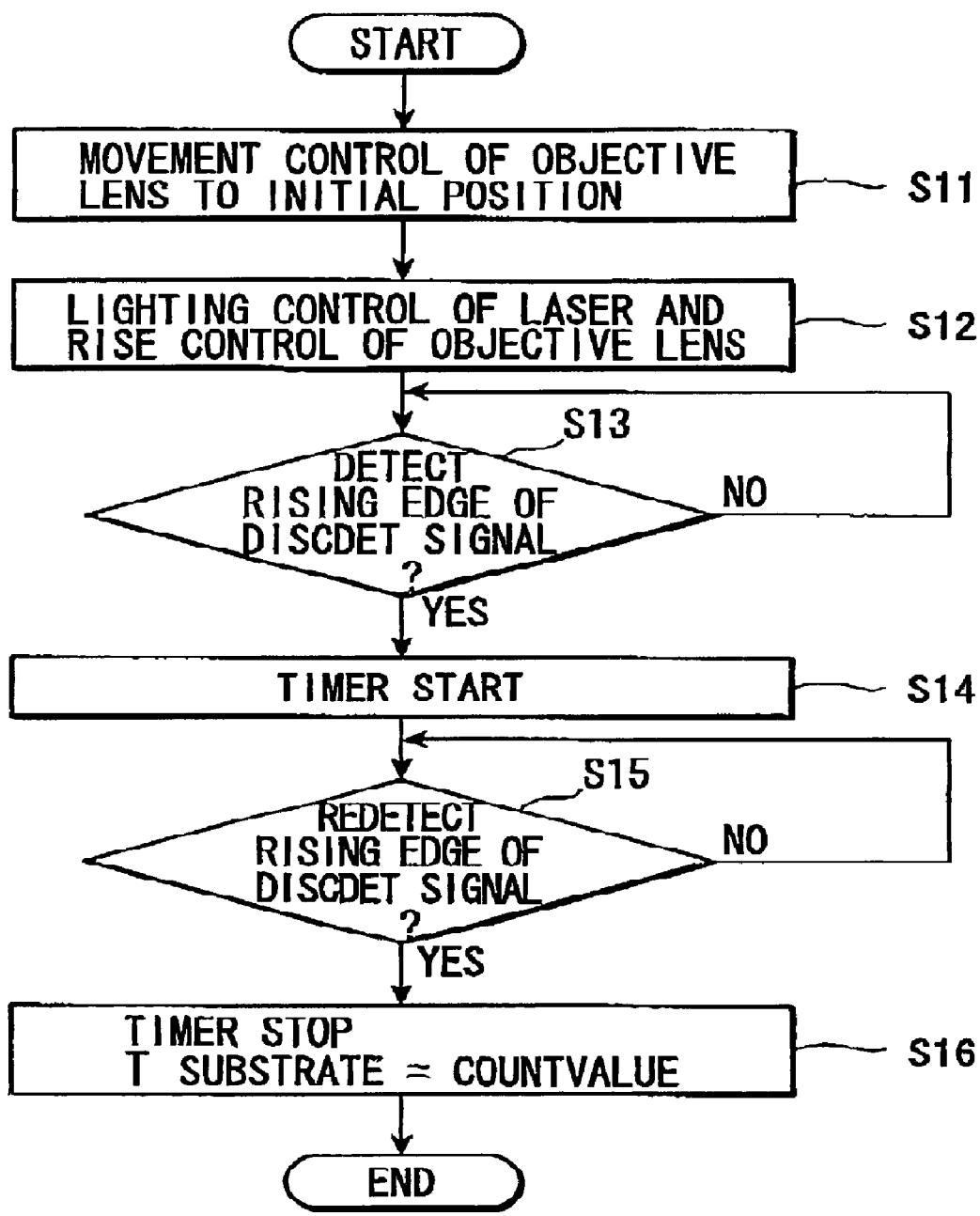

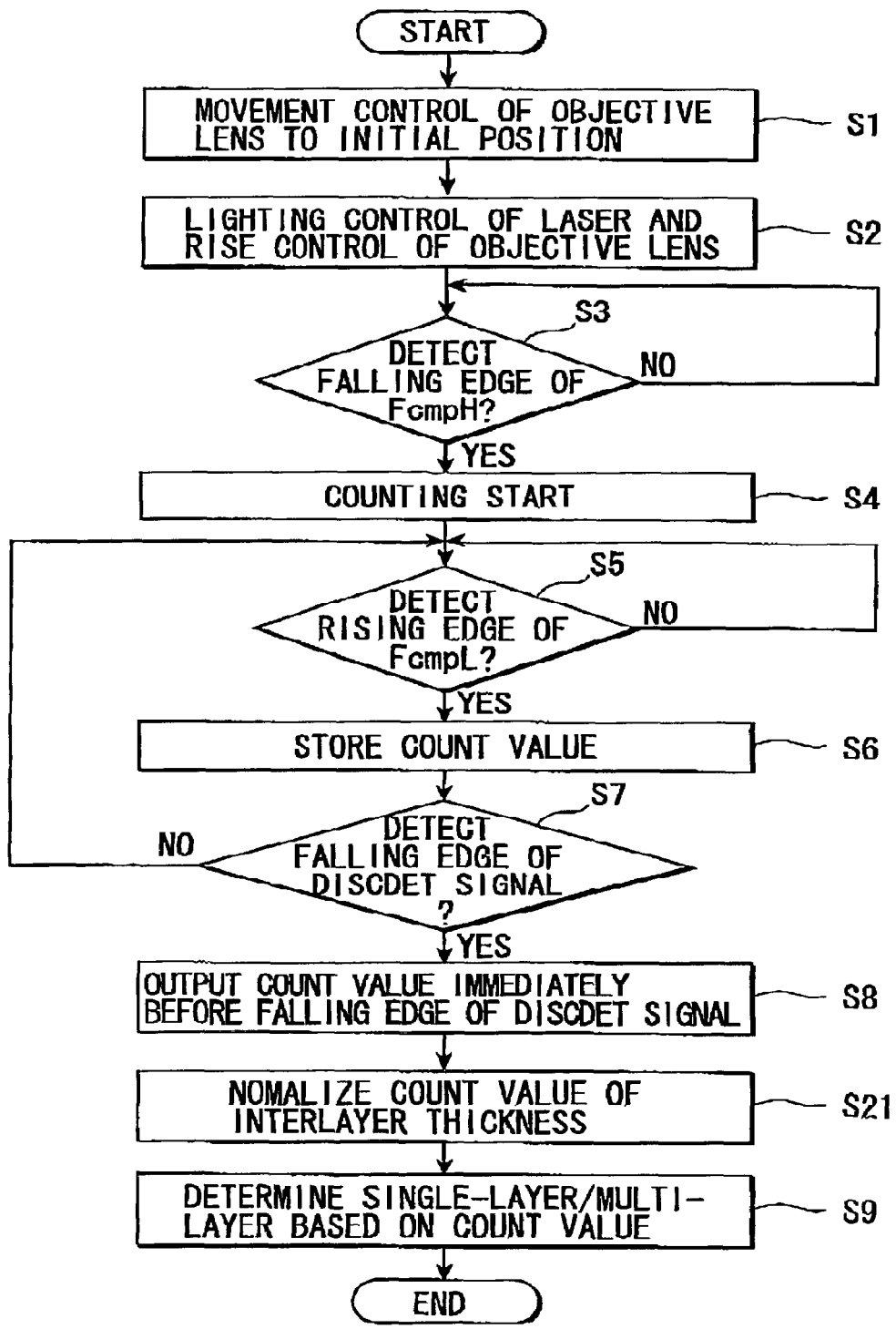

RECORDING LAYER DETERMINATION APPARATUS FOR DETERMINING WHETHER RECORDING LAYER OF RECORDING MEDIUM IS SINGLE-LAYER OR MULTI-LAYER

This application is related to Japanese Patent Application No. 2001-209937 filed on Jul. 10, 2001, and No. 2002-200463 filed on Jul. 9, 2002, based on which this application claims priority under the Paris Convention and the contents of which are incorporated herein by reference.

BACKGROUND OF THE INVENTION

1. Field of the Invention

The present invention relates to a recording layer determination apparatus for determining whether a recording layer is single-layer or multi-layer, a method for determining recording layer, a computer-readable recording medium having stored therein recording layer determination program to be executed on a computer, and a recording layer determination program to be executed on a computer, which are preferably provided for equipment capable of dealing with recording medium having respective constructions of the single-layer and multi-layer such as a video-game unit, a digital videodisc unit, a magnetic optical disc unit, or a magnetic disc unit.

2. Description of the Related Art

There is a conventionally known recording medium with two-dimensional structure where recording layer is "single-layer", such as CD-ROM or so forth.

Further, there is a known recording medium (three-dimensional recording medium) with three-dimensional structure of "multi-layer" where a plurality of recording layers are laminated, such as DVD, FMD (Fluorescent Multi-layer Disc) or so forth, besides the recording medium with two-dimensional structure of "single-layer."

Equipments for handling the recording medium with three-dimensional structure are required to ensure compatibility between the single-layer recording medium and the multi-layer recording medium. It is necessary to change setting of laser level, gain of each signal or so forth between the recording medium of the single-layer and the recording medium of the multi-layer for making it possible to operate both recording medium of the single-layer and the multi-layer Therefore, equipment capable of dealing with the three-dimensional recording medium determines whether the recording medium is the recording medium of the single-layer or the recording medium of the multi-layer before recording or reproducing. And then the equipment executes recording or reproducing with respect to the recording medium while changing setting of each unit on the basis of the determination result.

For example, in the case of a DVD unit capable of dealing with a DVD of the multi-layer, level determination system is adopted, where an optical pickup is brought near the DVD gradually from predetermined position to obtain difference of signal level of reproduce signal (sum−signal=RF signal) from the optical pickup, and then the DVD unit executes determination between the single-layer and the multi-layer or determination of phase change disc of DVD-RW and so forth based on the difference of signal level of the reproduce signal (sum−signal=RF signal) obtained from the optical pickup.

While, also in the case of the DVD unit capable of dealing with the DVD of the multi-layer, focus error count system is adopted, where an optical pickup is brought near the DVD gradually from predetermined position to obtain the number of error of focus error signal (FE signal) from the optical pickup, and then the DVD unit executes determination between the single-layer and the multi-layer based on counted value while counting the number of error of the focus error signal obtained from the optical pickup.

Specifically, in the above described level determination system, when the optical pickup is brought near the DVD gradually from the predetermined position with the optical pickup as constant laser level, the signal level of reproduce signal obtained from the optical pickup is a curved line as illustrated in FIG. 1 in the case of the DVD of the single-layer, while in the case of the DVD of the multi-layer the signal level of reproduce signal obtained from the optical pickup is a curved line as illustrated in FIG. 2.

Namely, as illustrated in FIG. 1 and FIG. 2, when the optical pickup is brought near the DVD gradually from the predetermined position (Disc Far→Disc Near), first, one reproduce signal (disc surface reflected signal) by reflected light from protection film of the disc made of polycarbonate resin is capable of being obtained, subsequently, the other reproduce signal (signal surface reflected signal) by reflected light from a recording layer (signal surface) is capable of being obtained.

As shown in FIG. 1 and FIG. 2, there is no level difference of the disc surface reflected signal between the single-layer (FIG. 1) and the multi-layer (FIG. 2). However, the signal surface reflected signal, in the case of the DVD of the single-layer, has one peak level corresponding to recording surface of the single-layer, further, the level itself is large on the other hand, in the case of the DVD of the multi-layer, the signal surface reflected signal of the multi-layer has a plurality of peak levels corresponding to a plurality of recording surfaces (in the case of example shown in FIG. 2, since the DVD comprises of two-layer, two peak levels exist). In addition, the peak level itself is low in comparison with the DVD of the single-layer caused by difference of transmittance of light of each layer or caused by diffused reflection of light because of existence of clearance gap between respective layers (reflection level P1>reflection level P2).

Therefore, in order to determine layer state, the level determination system sets a threshold value to be reference level between a peak level of a signal surface reflected signal obtained from the DVD of the single-layer and a peak level of a signal surface reflected signal obtained from the DVD of the multi-layer. And then the level determination system determines that is DVD is the DVD of the single-layer if the signal level of the signal surface reflected signal is the threshold value or more. While the level determination system determines that its DVD is the DVD of the multi-layer or its DVD is low reflection recording medium (phase change disc such as DVD-RW and so forth) if the signal level of the signal surface reflected signal is a signal level less than the threshold value.

Therefore, it is possible to execute determination between a single-layer low reflection recording medium and a multi-layer low reflection recording medium depending on difference of reflectance of each DVD of the low reflection recording medium of the single-layer or the low reflection recording medium of the multi-layer.

On the other hand, in the above described focus error count system, when the optical pickup is brought near the DVD gradually from the predetermined position with the optical pickup as constant laser level, in the case of the DVD of the single-layer, it is possible to obtain a focus error signal (FE) at backwards and forwards of the focus as illustrated in FIG. 3. In addition, in the case of the DVD of the multi-layer, it is possible to obtain a focus error signal at backwards and forwards of the focus a, illustrated in FIG. 4.

In the focus error count system, a threshold value for high level (FcmpH Slice Level) with respect to this focus error signal is set. According to this setting, the FcmpH signal to be a signal of high level is formed during the period where the value of the focus error signal is the threshold value for high level or more.

Alternatively, in the focus error count system, a threshold value for low level (FcmpL Slice Level) with respect to this focus error signal is set. According to this setting, the FcmpL signal to be a signal of high level is formed during the period where the focus error signal has value less than the threshold value for low level.

As indicated in the FcmpH signal or FcmpL signal shown in FIG. 3 and the FcmpH signal or the FcmpL signal shown in FIG. 4, in the case of the DVD of the single-layer, the number of pulse of the FcmpH signal or the FcmpL signal is one as shown in FIG. 3. However, in the case of the DVD of the multi-layer, the FcmpH signal or the FcmpL signal has plural number of pulses as shown in FIG. 4 (in the case of the example of FIG. 4, since the DVD is a DVD of two-layer, the FcmpH signal and the FcmpL signal have two pulses respectively.)

The focus error count system determines a DVD as a DVD of the single-layer if the number of pulse is one, while the focus error count system determines a DVD as a DVD of the multi-layer if the number of pulse is plural by counting the number of pulse. Therefore, the focus error count system is capable of determining whether recording layer of the DVD is a single-layer or a multi-layer.

However, the level determination system and the focus error count system to be the conventional determination system between the single-layer and the multi-layer have following problems, where, in the both systems, dependence on signal level of the reproduce signal or the focus error signal is large.

The level determination system is effective for judgment of setting of various kinds of gain at the time of recording and reproducing. However, there are problems that threshold value setting of optimum level is required in every equipment for determination between the single-layer and the multi-layer, or tolerance with respect to variation of reflectance of the media caused by secular change is narrow.

On the other hand, in the case of equipment of the focus error count system, because of the same reason as equipment of the level determination system, it is difficult to set the threshold value for high level (FcmpH Slice Level) or the threshold value for low level (FcmpL Slice Level) to optimum levels respectively, thus there is the problem that accurate pulse for counting is not formed.

In addition, in the case of the equipment of the focus error count system, there is the problem that it is not possible to execute counting the number of pulse accurately caused by generation of false pulse described below.

The focus error signal (FE) has, in some cases, undulation on its signal waveform at backwards and forwards of the focus caused by detecting method of the focus error, optical design of the optical pickup, temperature variation, signal gain and so forth as shown in FIG. 3 and FIG. 4. In cases where a level of the undulation becomes the threshold value for high level (FcmpH Slice Level) or more, or in a cases where a level of the undulation becomes a level less than the threshold value for low level (FcmpL Slice Level), false pulses, which are not generated primarily, are generated as illustrated by dotted line of pulse of waveform in FIG. 3 and FIG. 4.

In the case of the focus error count system, since determination between the single-layer and the multi-layer is executed by counting the number of pulse of the FcmpH signal or the FcmpL signal, if such false pulses are generated, the count value of the number of pulse of the FcmpH signal or the FcmpL signal becomes different count value from the original count value, it is not possible to execute accurate determination between the single-layer and the multi-layer.

For example, in the case of the DVD of the single-layer illustrated in FIG. 3, the count value of the number of pulse of the FcmpH signal or the FcmpL signal should originally be one. However, since dotted line waveform of false pulse is counted, counted value becomes two, although the DVD should be the DVD of the single-layer, the DVD is inadvertently determined as the DVD of the multi-layer.

SUMMARY OF THE INVENTION

The present invention has been proposed in consideration of the above-mentioned problems, and an object of the present invention is to provide a new determination system for determining between the single-layer and the multi-layer instead of the focus error count system and the level determination system and to provide a recording layer determination apparatus, a method for determining recording layer, a computer-readable recording medium having stored therein recording layer determination program to be executed on a computer, and a recording layer determination program to be executed on a computer, which are capable of executing determination between the single-layer and the multi-layer of the recording medium accurately while eliminating influence or characteristic difference of every equipment, variation of reflectance of the recording medium, variation of environmental temperature, and false pulse generated by the undulation of the focus error signal.

The present invention controls movement of focus of light in the direction along optical path or the light, where the focus of the light is obtained in such a way as to irradiate the light approximately perpendicular to recording surface of recording medium, and detects interlayer thickness of the recording layer of the recording medium on the basis of reflected light of the light reflected by the recording medium. And then, determination whether the recording layer of the recording medium is single-layer or multi-layer is executed on the basis of the value of the detected interlayer thickness.

BRIEF DESCRIPTION OF THE DRAWINGS

The above and other features will be better understood from the exemplary embodiments described below, taken together with the drawings, of which:

FIG. 12 is a flowchart illustrating flow process for detecting thickness from surface portion of protection film of the DVD to surface portion of recording layer therebetween in the video-game unit of the second embodiment; and FIG. 13 is a flowchart illustrating flow of recording layer determination process in the video-game unit of the second embodiment.

DETAILED DESCRIPTION OF THE PREFERRED EMBODIMENTS

The present invention is applicable to a video-game unit for executing video-game while reproducing a video-game program stored in a DVD in which respective constructions of recording media of the single-layer of recording layer and multi-layer of recoding layer exist.

Configuration of the First Embodiment

Figure 1:
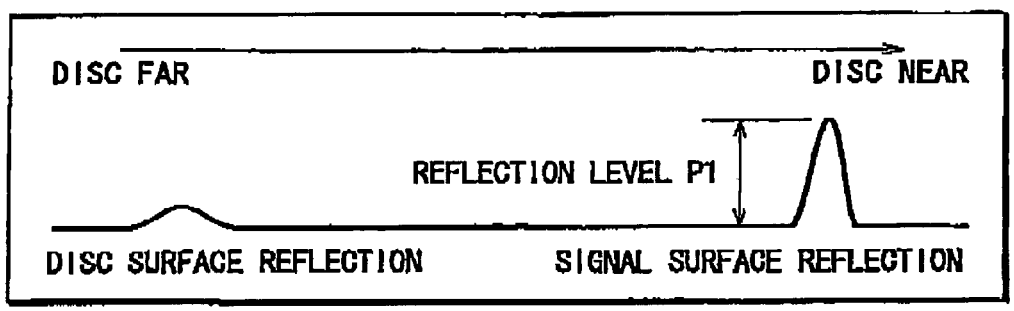
FIG. 1 is a diagram for explaining signal level of RF signal obtained from a DVD of the single-layer.
Figure 2:
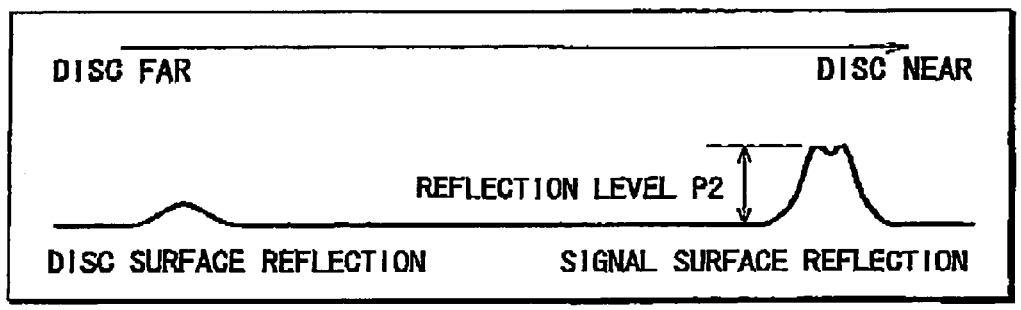
FIG. 2 is a diagram for explaining signal level of RF signal obtained from a DVD of the multi-layer.
Figure 3:
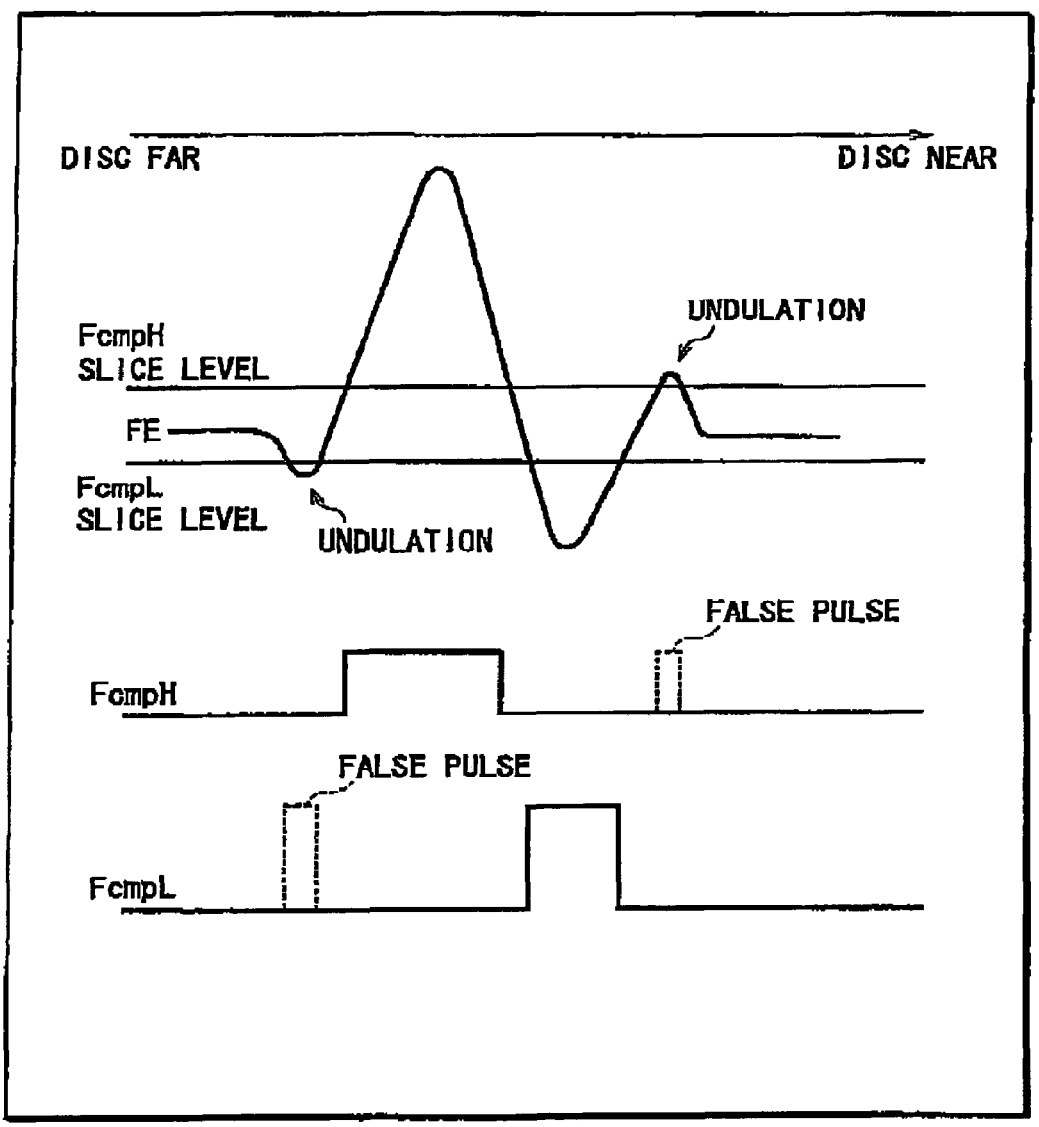
FIG. 3 is a diagram illustrating false pulse generated by undulation of a focus error signal obtained from the DVD of the single-layer.
Figure 4:
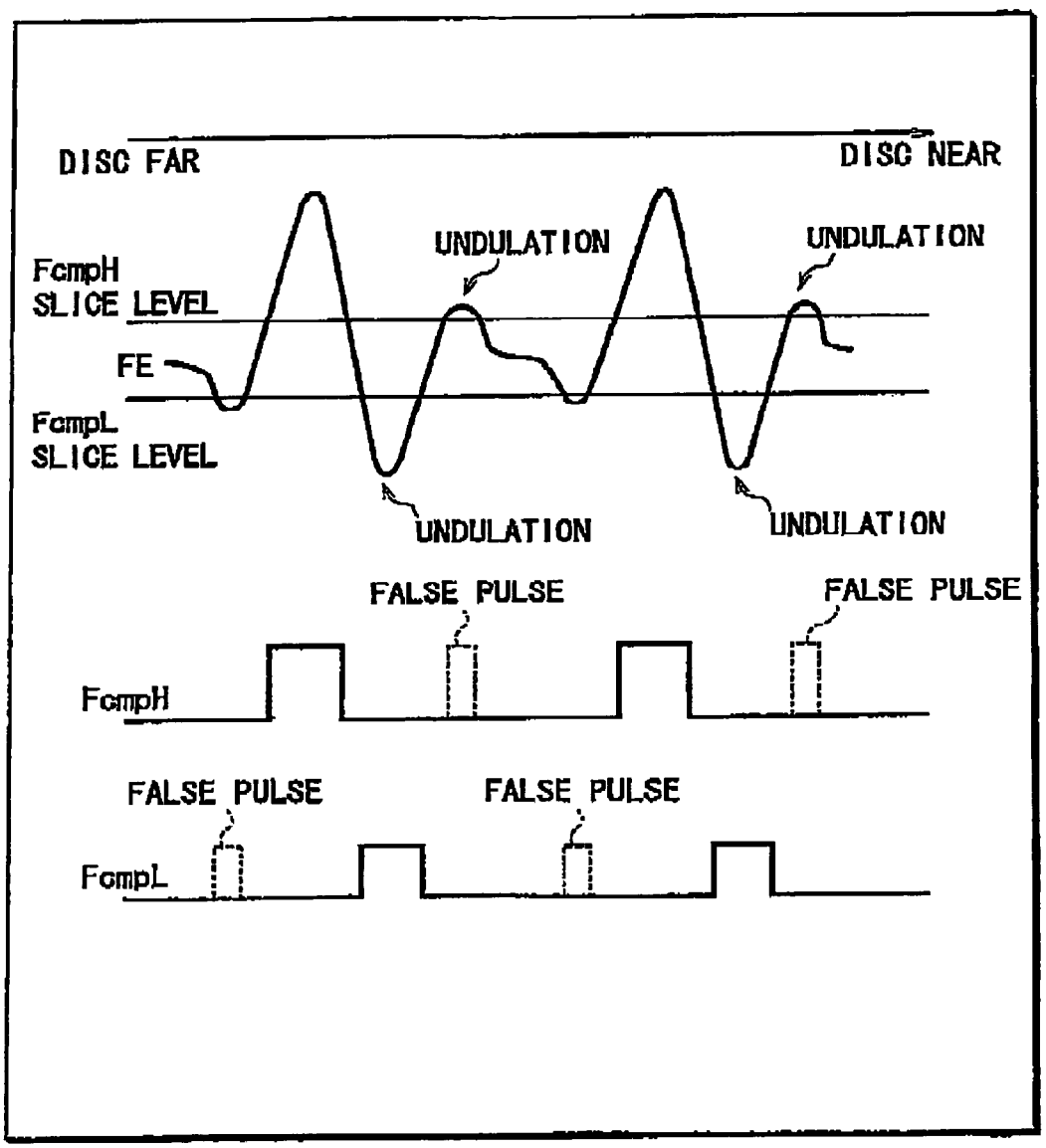
FIG. 4 is a diagram illustrating false pulse generated by undulation of a focus error signal obtained from the DVD of the multi-layer.
Figure 5:
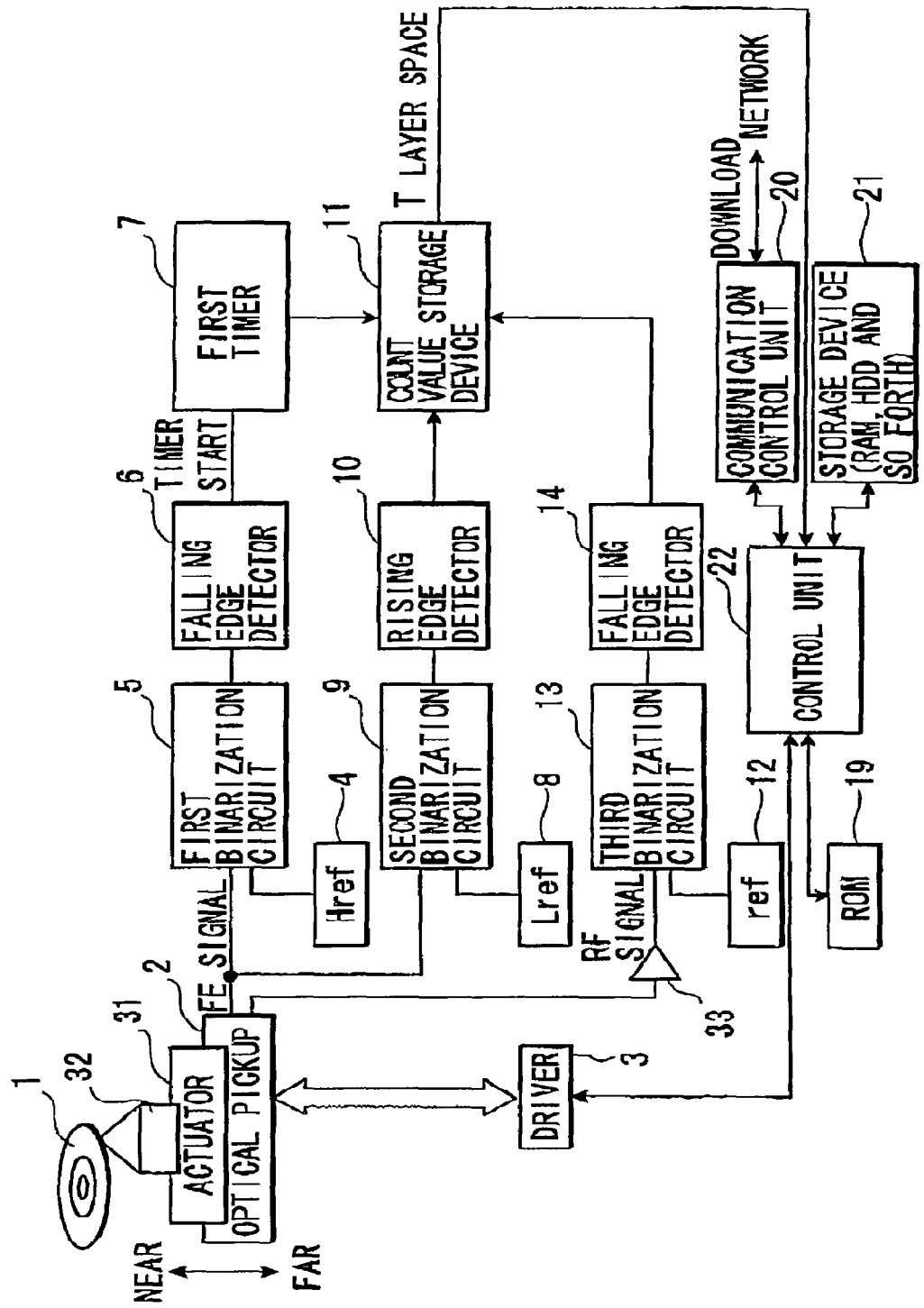
FIG. 5 is a block diagram of a video-game unit of a first embodiment to which the present invention is applied.

The video-game unit to be the first embodiment of the present invention has a recording layer determination function for determining whether a recording layer of a DVD illustrated in FIG. 5 is a single-layer or a multi-layer with the exception of execution function of the video game. AS indicated in FIG. 5, the video-game unit of this embodiment, as the recording layer determination function of the DVD, has an optical pickup 2 which irradiates laser beam to the DVD 1 and then forms at least a focus error signal (FE signal) on the basis of reflected light of the laser beam, and a driver 3 for moving focus of the laser beam from a predetermined position (hereinafter, referred to as Far position) distant from surface of the DVD 1 to a position (hereinafter, referred to as Near position) close to the surface of the DVD 1 while driving an objective lens 32 of the optical pickup 2 at the time determination is executed whether the recording layer of the DVD 1 is the single-layer or the multi-layer.

In addition, the video-game unit has Href circuit 4 for setting a threshold value for high level (Href) with respect to the focus error signal from the optical pickup 2, a first binarization circuit 5 for causing the focus error signal from the optical pickup 2 to be subjected to binarization on the basis of the threshold value for high level that is set by the Href circuit 4, a falling edge detector 6 for detecting falling edge of the focus error signal which is subjected to binarization by the first binarization circuit 5, and a timer 7 which starts counting of the time at the timing when the falling edge of the focus error signal at the falling edge detector 6 is detected.

In addition, the video-game unit has Lref circuit 2 for setting a threshold value for low level (Lref) with respect to the focus error signal from the optical pickup 2, a second binarization circuit 9 for causing the focus error signal from the optical pickup 2 to be subjected to binarization on the basis of the threshold value for low level set by the Lref circuit 8, and a rising edge detector 10 for detecting the rising edge of the focus error signal which is subjected to binarization by the second binarization circuit 9.

In addition, the video-game unit has an amplifier 33 for amplifying reproduce signal (RF signal=sum–signal) from the optical pickup 2 with a predetermined gain, a ref-circuit 12 for sitting a threshold value (ref) for causing the RF signal from the amplifier 33 to be subjected to binarization, a third binarization circuit 13 for causing the reproduce signal from the optical pickup 2 to be subjected to binarization the basis of the threshold value set at the ref-circuit 12, a falling edge detector 14 for detecting the falling edge of the reproduce signal which is subjected to binarization at the third binarization circuit 13, a count value storage device 11 which stores count value from the timer 7 sequentially in every time the rising edge of the focus error signal is detected at the rising edge detector 10, and which outputs the count value of the time stored ultimately as a count value (T layer space) is corresponding to interlayer thickness of the recording layer of the DVD 1 at the timing when the falling edge of the reproduce signal is detected at the falling edge detector 14.

In addition, the video-game unit has a memory (ROM) 19 in which a recording layer determination program for determining whether the recording layer is the single-layer or the multi-layer is Stored, a communication control unit 20 for downloading the recording layer determination program from a server machine connected to a predetermined network such as internet and so forth, a storage device 21 which is a memory (RAM) or a hard disc (HDD) for storing the recording layer determination program downloaded by the communication control unit 20, and a control unit 22 for executing the total control of the unit as well as execution control of the video game and the recording layer determination control.

Determination Operation whether Recording Layer is Single-Layer or Multi-Layer

Figure 6:
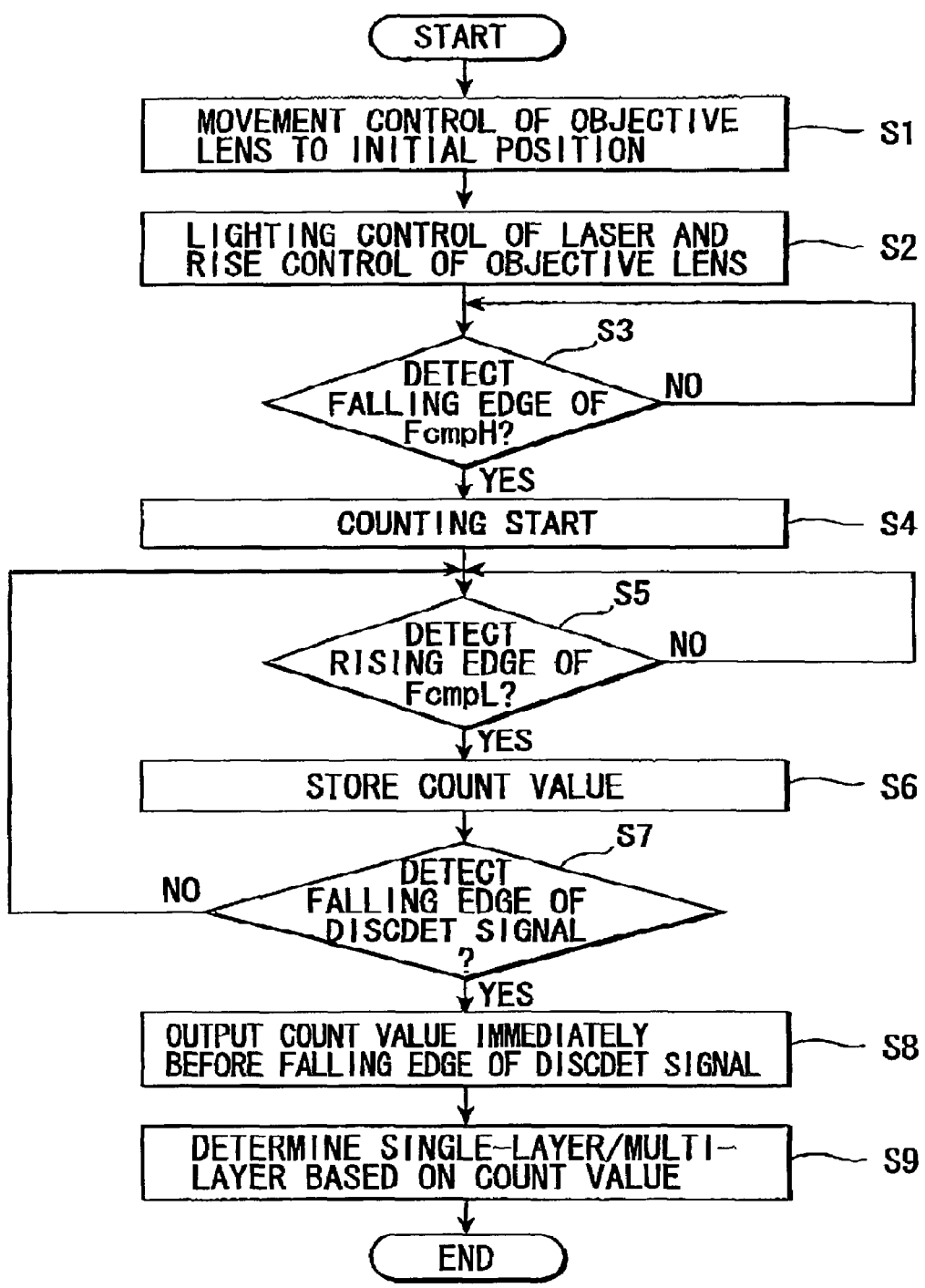
FIG. 6 is a flowchart illustrating flow of recording layer determination process in the video-game unit of the first embodiment.

Next, determination operation of the recording layer of the DVD 1 at the video-game unit that has above-described configuration will be explained. FIG. 6 is a flowchart illustrating flow of recording layer determination process for executing determination whether the recording layer is the single-layer or the multi-layer. An execution program of the recording layer determination illustrated in this flowchart is stored in the ROM 19 beforehand, and the control unit 22 reads out the execution program of the recording layer determination from the ROM 19 to perform execution control.

It should be noted that it is also preferable that the read out execution program for recording layer determination stored in the DVD 1 may be installed beforehand in the storage device 21 of the RAM or the HDD or so forth for future processes after which the installed execution program in the storage device 21 may be read out to perform execution control of recording layer determination process from next time.

In addition, it is also preferable that the read out execution program for recording layer determination stored in the DVD 1 is made to install in the storage device 21 of the RAM or the HDD or 50 forth beforehand, and the execution program for recording layer determination installed in the storage device 21 may be made to read out in order to perform execution control of recording layer determination process from the next time.

In addition, the execution program for recording layer determination illustrated in this flowchart is made to download from the server machine on Internet through the communication control unit 20 to the storage device 21 and then the storage device 21 stores the downloaded execution program for recording layer determination once to control, then the control unit 22 preferably reads out the execution program for recording layer determination stored in the storage device 21 to perform execution control.

Such recording layer determination process illustrated in the flowchart of FIG. 6 starts with timing when the control unit 22 of the video-game unit detects loading of the DVD 1.

In the case of the video-game unit of this embodiment, determination of the recording layer is executed with inner periphery side of the DVD 1 as an object (It should be noted that the determination may be preferably executed by using outer periphery side of the DVD 1, or intermediate portion between inner periphery and outer periphery as an object.) Therefore, the control unit 22, in STEP S1, controls to move actuator 31 through the driver 3 so that the objective lens 32 of the optical pickup 2 is positioned at a position (Far position) only predetermined distance apart from the DVD 1, which position is also inner periphery side predetermined position of the DVD 1.

In addition, the control unit 22, in STEP S2, executes lighting control of a semiconductor laser of the optical pickup 2 so as to control laser beam irradiation toward the inner periphery surface of the DVD 1, and executes drive control of the actuator 31 through the driver 3 so that the objective lens 32 located at the position (Ear position) above-described predetermined distance apart is brought near the position (Near position) close to the protection film of the DVD 1 with constant speed gradually. For this reason, focus of the laser beam moves so as to be brought near the recording layer of the DVD 1 gradually.

Next, the laser beam irradiation to the DVD 1 from the optical pickup 2 generates reflected light because the laser beam is reflected by the DVD 1. Photo detector provided within the optical pickup 2 receives the reflected light. And then, the photo detector forms focus error signal (FE signal: formed by, for instance, astigmatism method) depending on amount of received light and condition of received light, and forms RF signal (sum–signal) from reflected light of received light. The focus error signal is supplied to the first binarization circuit 5 and the second binarization circuit 9, while the RF signal is amplified by the amplifier 33 using predetermined gain to be supplied to the third binarization circuit 13.

Figure 7:
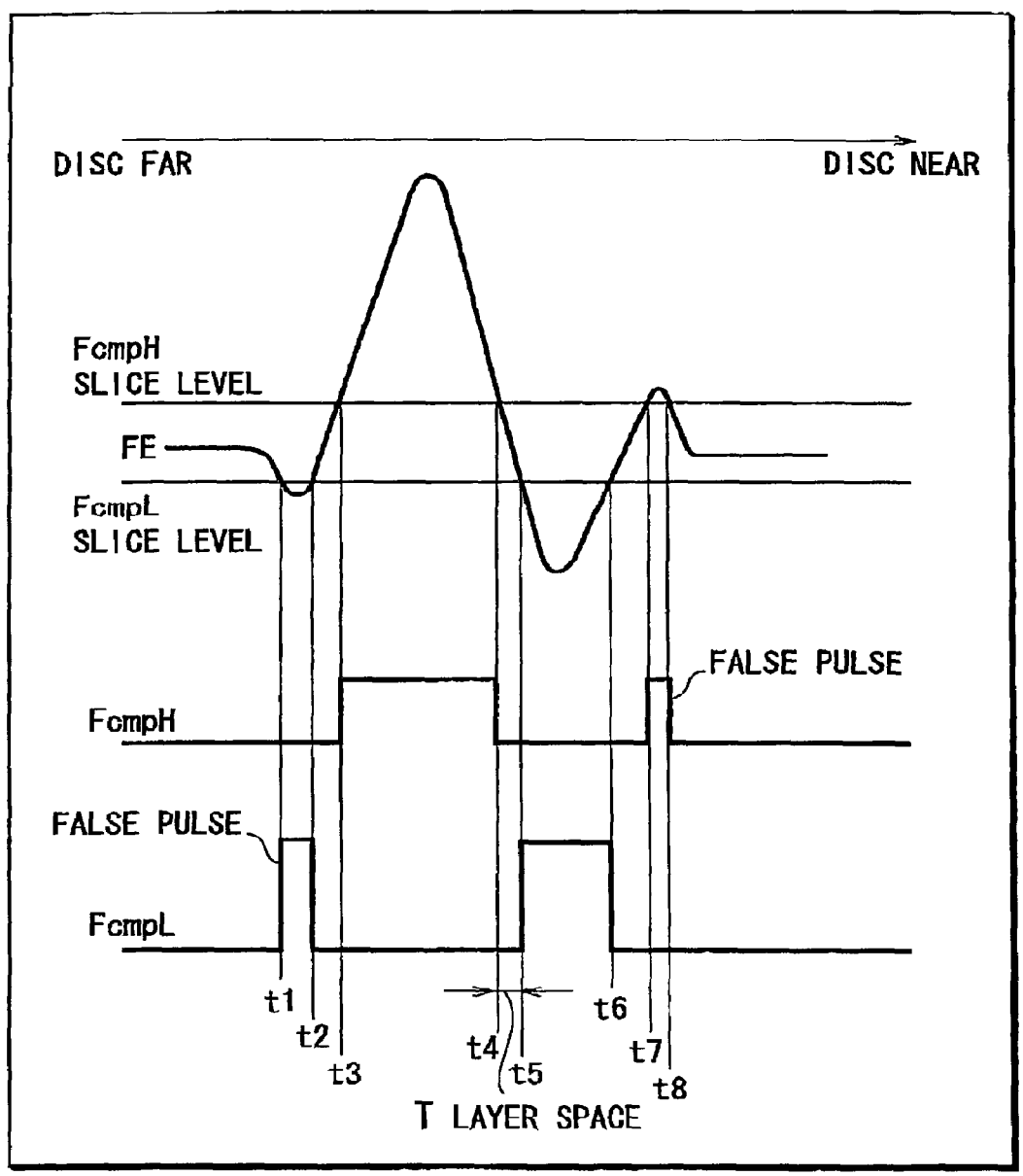
FIG. 7 is a diagram illustrating a threshold value fox high level and a threshold value for low level set for focus error signal obtained from the DVD of the single-layer and FcmpH signal and FcmpL signal formed on the basis of the respective threshold values in the video-game unit of the first embodiment.

In the case of the DVD of the single-layer, it is possible to obtain a focus error signal with one cycle amplitude illustrated in FIG. 7 extending backwards and forwards of the focus with respect to the recording surface when controlling movement of the objective lens 32 of the optical pickup 2 with constant speed from the above described Far position to the Near position. While, in the case of the DVD of the multi-layer (in the example of this case: two-layer), it is possible to obtain a focus error signal with two-cycle amplitudes illustrated in FIG. 8 extending backwards and forwards of the focus with respect to the recording surface of respective recording layers.

Figure 8:
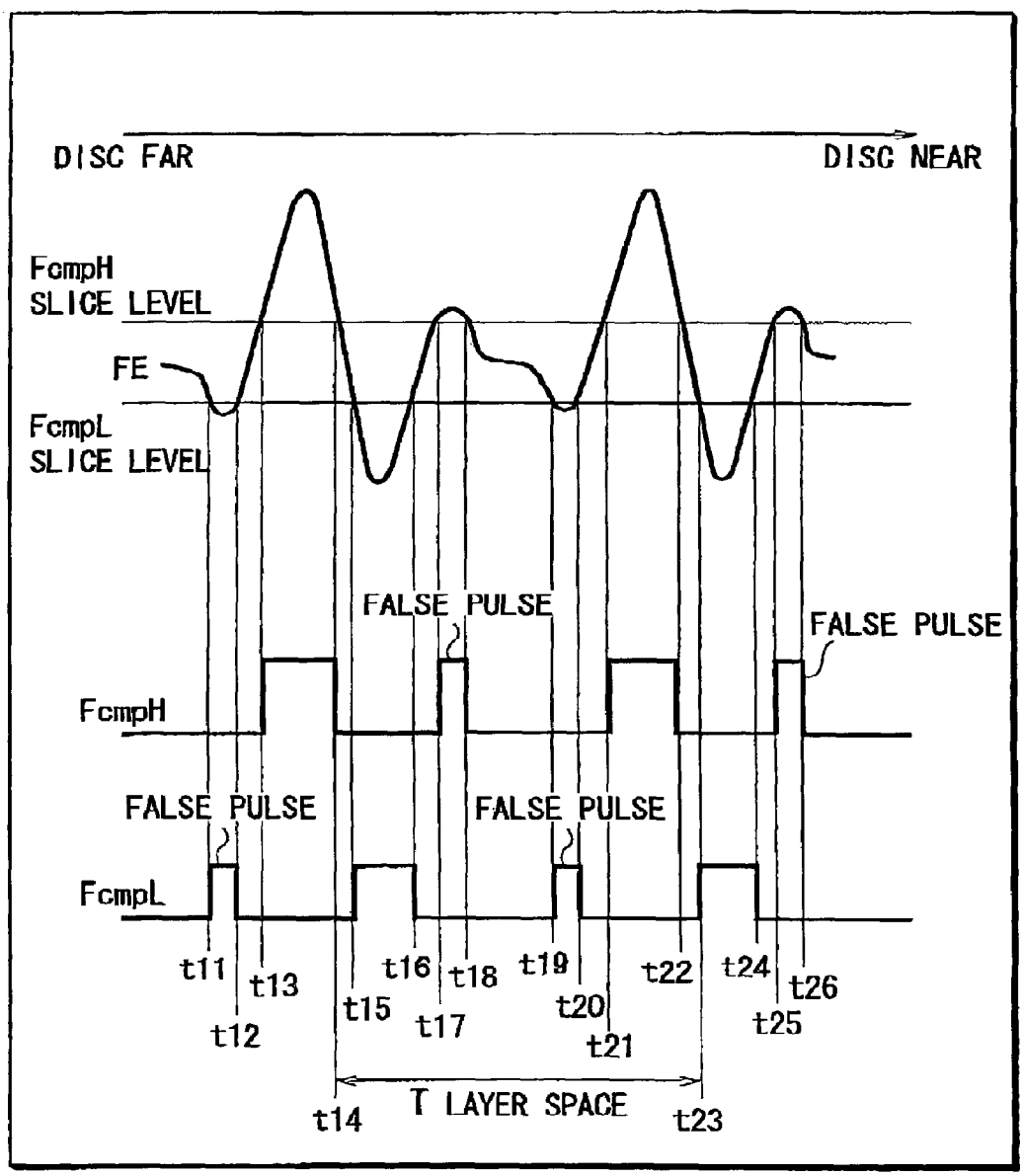
FIG. 8 is a diagram illustrating a threshold value for high level and a threshold value for low level set for focus error signal obtained from the DVD of the multi-layer (two-layer) and FcmpH signal and FcmpL signal formed on the basis of the respective threshold values in the video-game unit of the first embodiment.

As indicated in FIG. 7 and FIG. 8, the threshold value for high level (FcmpH Slice Level) due to the Href circuit 4 is set to the first binarization circuit 5 to which such locus error signal is supplied In addition, as indicated in FIG. 7 and FIG. 8, the threshold value for low level (FcmpL Slice Level) due to the Lref circuit 8 is set to the second binarization circuit 9.

It should be noted that since smaller level of the focus error signal of the DVD 1 of the multi-layer than level of the focus error signal of the DVD 1 of the single-layer appears, it may be suitable that levels of the threshold value for high level (FcmpH Slice Level) and the threshold value for low level (FcmpL Slice Level) may preferably be made to set by adjusting it to the focus error signal of the DVD of the multi-layer with small level.

The first binarization circuit 5 forms the FcmpH signal to be high level in such a way that the first binarization circuit 5 makes the focus error signal binarization on the basis of the threshold value for high level (FcmpH Slice Level). The FcmpH signal becomes high level during respective periods of between the time t3 and the time t4, between the time t7 and the time t8, between the time t13 and the time t14, between the time t17 and the time t18, between the time t21 and the time t22, and between the time t25 and the time t26 as illustrated in FIG. 7 and FIG. 8, all of which are periods where the level of the focus error signal is the threshold value for high level or more. The first binarization circuit 5 supplies the FcmpH signals to the falling edge detector 6.

The falling edge detector 6 detects "an initial falling edge" of the FcmpH signal illustrated at the time t4 of FIG. 7 and FIG. 8, and then the falling edge detector 6 supplies the detection output to the timer 7 with the timing when the falling edge is detected The timer 7 starts counting of the time when the detection output of the initial falling edge of the FcmpH signal is supplied, and then the timer 7 supplies the count value to the count value storage device 11.

STEP S3 of the flowchart illustrated in FIG. 6 is STEP where the falling edge detector 6 monitors timing of "the initial falling edge" of the FcmpH signal, then the recording layer determination process proceeds to STEP S4 with the timing when the falling edge detector 6 detects "the initial falling edge" of the FcmpH signal, and counting of the time by the timer 7 is started.

While, the second binarization circuit 9 forms the FcmpL signal to be high level in such a way that the second binarization circuit 9 makes the focus error signal binarization on the basis of the threshold value for low level (FcmpL Slice Level) The FcmpL signal becomes high level during respective periods of between the time t1 and the time t2, between the time t5 and the time t6, between the time t11 and the time t12, between the time t15 and the time t16, between the time t19 and the time t20, and between the time t23 and the time t24 as illustrated in FIG. 7 and FIG. 8, all of which are periods where the focus error signal has the level less than the threshold value for low level. The second binarization circuit 9 supplies the FcmpL signals to the rising edge detector 10.

The rising edge detector 10 detects each rising edge of the FcmpL Signal illustrated at the time t3, the time t5, the time t11, the time t15, the time t19, and the time t23 of FIG. 7 and FIG. 8, and then the rising edge detector 10 supplies the each detection output to the count value storage device 11 with the timing when the rising edge is detected.

The count value storage device 11 stores therein count value of the time supplied from the timer 7 with the timing when the detection output of the rising edge of the FcmpL signal from the rising edge detector 10 is supplied. Therefore, in the case of this example, each count value of the time supplied from the timer 7 with the timing of the time t1, the time t5, the time t11, the time t15, the time t19, and the time t23 illustrated in FIG. 7 and FIG. 8 is stored in the count value storage device 11.

On the other hand, when moving the objective lens 32 of the optical pickup 2 from the above described Far position to the Near position with constant speed gradually, the focus of the laser beam moves from the protection film of the disc surface to the recording layer to be the signal surface. For this reason, it is possible to obtain the RF signal with respect to both the DVD 1 of the single-layer and the DVD 1 of the multi-layer with the large level as illustrated in FIG. 9 and FIG. 10 at the timing when the focus of the laser beam is in accord with the protection film of the disc surface and on the occasion when the focus of the laser beam is in accord with the recording layer to be the signal surface.

Ref circuit 12 sets a threshold value (ref) to the third binarization circuit 13 to which such RF signal is supplied. This threshold value (ref) is used in executing respective binarization of the RF signal that level becomes large level at the timing the focus of the laser beam is in accord with the protection film of the disc surface and the RF signal that level becomes large level on the occasion when the focus of the laser beam is in accord with the recording layer of the signal surface as shown in FIG. 9 and FIG. 10.

The third binarization circuit 13 forms Discdet signal in such a way as to make the RF signal binarization on the basis of the threshold value (ref). As indicated in FIG. 9 and FIG. 10, the Discdet signal becomes high level on the occasion when the focus of the laser beam is in accord with the protection film of the disc surface and when the focus of the laser beam is in accord with the recording layer to be the signal surface as illustrated at time period between the time t31 and the time t32, period between the time t33 and the time t34, and period between the time t41 and the time t42, period between the time t43 and the time t44. The third binarization circuit 13 supplies the Discdet signal to the falling edge detector 14.

Figure 9:
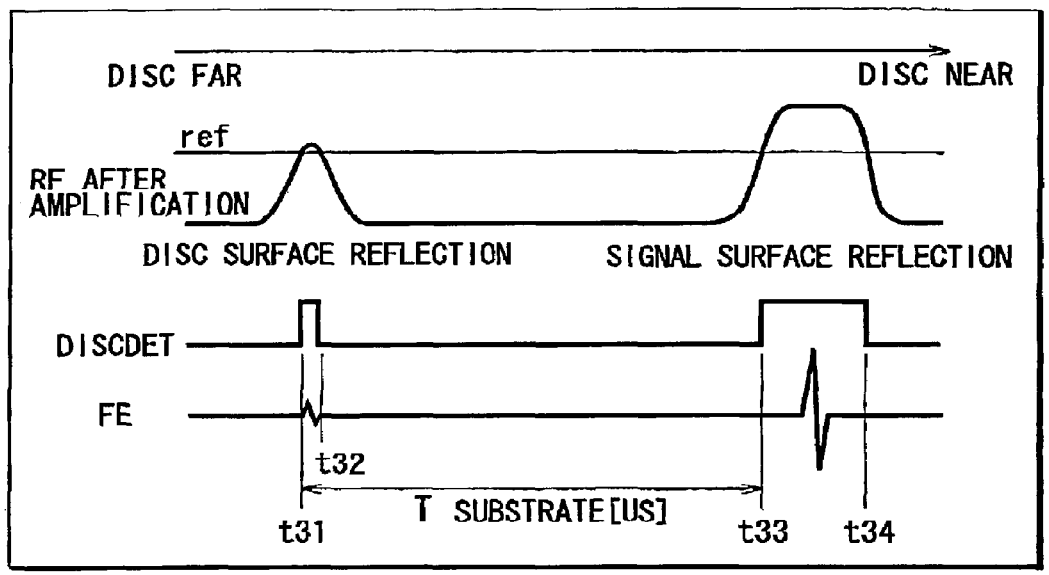
FIG. 9 is a diagram illustrating a threshold value set for RF signal obtained from the DVD of the single-layer and Discdet signal formed on the basis of this threshold value in the video-game unit of the first embodiment.
Figure 10:
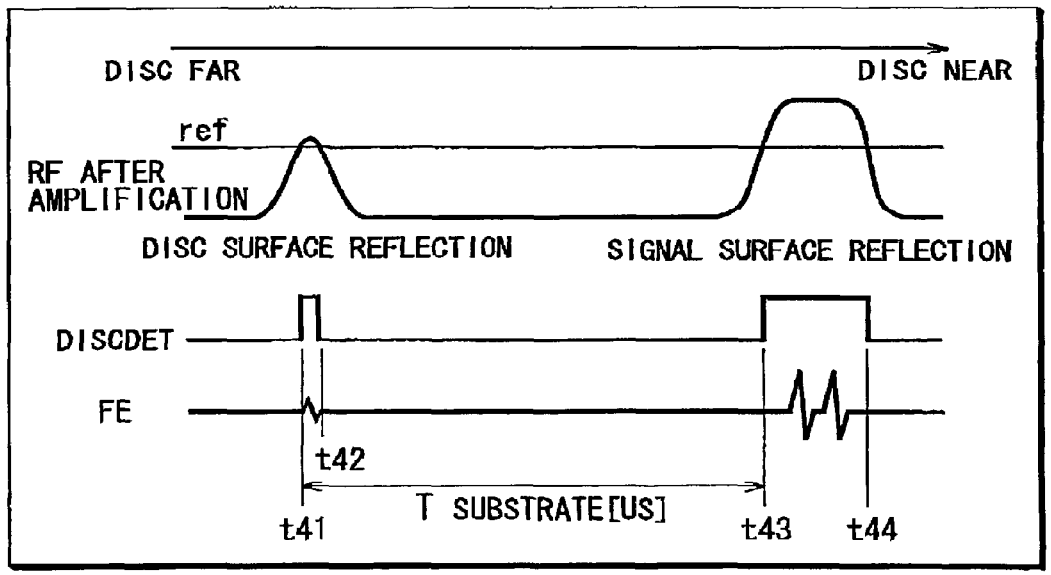
FIG. 10 is a diagram illustrating a threshold value set for RF signal obtained from the DVD of the multi-layer and Discdet signal formed on the basis of this threshold value in the video-game unit of the first embodiment.

The focus error signal (FE) is also illustrated in FIG. 9 and FIG. 10 together with the Discdet signal. As indicated in FIG. 9 and FIG. 10, the timing when the focus error signal appears at backwards and forwards of the focus with respect to the recording surface of the DVD 1 becomes the same timing as that the second Discdet signal appears (in FIG. 9: period between the time t33 and the time t34, in FIG. 10: period between the time t43 and the time t44).

Therefore, the falling edge detector 14 detects the falling edge of the Discdet signal of second high level illustrated at the time t34, the time t44 of FIG. 9 and FIG. 10 that is generated at the timing of the falling of the focus error signal which appears at backwards and forwards of the focus with respect to the recording surface, and supplies the detection output to the count value storage device 11 with this timing.

When the detection output from the falling edge detector 14 is supplied, the count value storage device 11 supplies the count value of the time from the timer 7 stored immediately before the detection output is supplied, to the control unit 22 as a count value (T layer space) corresponding to distance (interlayer thickness) between the recording layers of the DVD 1.

Namely, as described above, in cases where the timer 7 starts counting of the time with the timing of the falling edge of the FcmpH signal, and this count value is made to store sequentially with the timing of the rising edge of the FcmpL signal, in the case of the DVD 1 of the single-layer, counting of the timer 7 is started with the timing of the time t4 of the FcmpH signal illustrated in FIG. 7, and the count value of the time from the timer 7 is stored in the count value storage device 11 with the timing of the time t5 of the FcmpL signal.

In addition, in the case of the DVD 1 of the multi-layer, counting of the timer 7 is started with the timing of the time t14 of the FcmpH signal illustrated in FIG. 8, and the respective count values of the time from the timer 7 are stored in the count value storage device 11 with the timings of the time t15, the time t19, the time t23 of the FcmpL signal.

The count value storage device 11 supplies count values (T layer space) of the time from the timer 7 to the control unit 22, where the count values (T layer space) are stored with the timing of the rising edge of the FcmpL signal illustrated at the time t5 of FIG. 7 or with the timing of the rising edge of the FcmpL signal illustrated at the time t23 of FIG. 8 from among the count values of the time thus stored.

The count values of the times of the timer 7 during the periods from the falling edge of the FcmpH signal to the rising edge of the FcmpL signal to be the count values of the times from the timer 7 between the time t4 and the time t5 of FIG. 7 and between the time t14 and the time t23 of FIG. 8 are values corresponding to interlayer thickness of the DVD 1 of the single-layer or the multi-layer (in the case of this example: two-layer).

As indicated in period between the time t4 and the time t5 of FIG. 7 and period between the time t14 and the time t23 of FIG. 8, since interlayer thickness does not exist in the DVD 1 or the single-layer illustrated in FIG. 7, distance (T layer space) corresponding to this interlayer thickness scarcely exists, while since interlayer thickness exists in the DVD 1 of the multi-layer illustrated in FIG. 8, distance corresponding to this interlayer thickness is wide in comparison with the DVD 1 of the single-layer.

Therefore, it is possible to determine that the DVD 1 is a DVD of the single-layer when the count value is less than the predetermined count value in the control unit 22 by supplying the count value of the time corresponding to the interlayer thickness to the control unit 22, while it is possible to determine that the DVD 1 is a DVD of the multi-layer when the count value is the predetermined count value in the control unit 22 or more by supplying the count value of the time corresponding to the interlayer thickness to the control unit 22.

Such processing flow from counting start of the timer 7 to the recording layer determination in the control unit 22 corresponds to STEP from STEP S4 to STEP 39 of the flowchart of FIG. 6.

Namely, when counting of the timer 7 is started in STEP S4, in STEP S5 and STEP S6, during the period until the falling edge detector 14 can detect the falling edge of the second high level Discdet signal in STEP S7, the count value storage device 11 stores therein count value of the time from the timer 7 in every time the rising edge of the FcmpL signal is detected at the rising edge detector 10.

And then, in STEP S7, the count value storage device 11, when the falling edge of the Discdet signal is detected, supplies the count value of the time which is stored with the timing immediately before the falling edge of the Discdet signal being detected, to the control unit 22 as the count value corresponding to the interlayer thickness of the DVD 1, subsequently in STEP S9, the control unit 22 executes the recording layer determination of the DVD 1 on the basis of the count value.

In the case of the video-game unit of the embodiment, the timing when the counting of the timer 7 starts is the timing when the initial falling edge of the FcmpH signal is detected As shown in FIG. 7 and FIG. 8, in the FcmpH signal, an initial pulse is the true pulse due to the focus error component, false pulse is mixed in the second pulse and subsequent pulses. Therefore, the counting of the timer 7 is capable of being started on the basis of the true pulse without being affected influence of the false pulse in such a way as to start counting of the timer 7 with the timing when the initial falling edge of the FcmpH signal is detected (With respect to the FcmpH signal, only the initial true pulse is utilized as trigger of counting start of the timer 7.)

In addition, in the FcmpL signal, as indicated in FIG. 7 and FIG. 8, a false pulse is generated initially, after that, false pulses and true pulses are mixed, however, pulses at rime period between the time t5 and the time t6, and at time period between the time t23 and the time t24 formed with the timing immediately before the falling edge of the Discdet signal are true pulses. Therefore, it is possible to detect the count values corresponding to the interlayer thickness accurately while using the true pulses without being affected by the false pulse in such a way as to detect the count value formed with the timing immediately before the falling edge of the Discdet signal as the count value corresponding to the interlayer thickness of the DVD 1.

Namely, in the video-game unit of the embodiment, if the objective lens 32 of the optical pickup 2 is made to move from the Par position to the Near position, in the case of the FcmpH signal, since the true pulse is formed initially, in order to avoid influence of the false pulse, start control of the counting of the timer 7 is made while using the initial true pulse. While, in the case of the FcmpL signal, since the true pulse is formed at last of the focus error signal, in order to avoid influence of the false pulse, the count value of the timer 7 in taken in while using the last true pulse. For this reason, it is possible to take in the count value of the time corresponding to the interlayer thickness accurately while using only true pulse without being affected by the false pulse.

Accordingly, it is possible to determine that if the count value of the time is smaller than the predetermined value, a DVD is a DVD of the single-layer by executing the recording layer determination of the DVD 1 while using count value of the time accurately corresponding to such interlayer thickness.

In addition, it is possible to determine that if the count value of the time is lager than the predetermined value, a DVD is a DVD of the multi-layer.

As is clear from the above explanation, the video-game unit of the first embodiment sets the threshold value for high level (FcmpH) and the threshold value for low level (FcmpL) with respect to the focus error signal obtained on the occasion when the objective lens 32 of the optical pickup 2 is made to move from the Far position to the Near position with constant speed.

In the FcmpH signal formed on the basis of the threshold value for high level (FcmpH), the true pulse appears initially (FIG. 7; period between the time t3 and the time t4, FIG. 8: period between the time t13 and the time t14), and since there is possibility that the false pulse is mixed in the second pulse and subsequent pulses, the counting of the timer 7 is made to start on the basis of the initial true pulse.

While, in the FcmpL signal formed on the basis of the threshold value for low level (FcmpL), the true pulse appears at the last of the period of time the focus error signal appears. Therefore, the period of time the focus error signal appears is detected on the basis of the RF signal (FIG. 9: period between the time t33 and the time t34, FIG. 10: period between the time t43 and the time t44), and then the count value of the time of the timer 7 is made to detect with the timing of the FcmpL signal (FIG. 7: period between the time t5 and the time t6, FIG. 8: period between the time t23 and the time t24) that appears at the last period of time focus error signal appears.

The count value of the time of the timer 7 becomes value corresponding to the interlayer thickness between respective recording layers, thus the count value of the time of the timer 7 becomes very small count value in the case of the DVD of the single-layer, while the count value of the time of the timer 7 becomes large value in the case of the DVD of the multi-layer. Therefore, a threshold value is made to set in between the count value obtained in the case of the DVD of the single-layer and the count value obtained in the case of the DVD of the multi-layer, so that it is possible to determine DVD comprises of single-layer when the detected count value is smaller than the threshold value, while it is possible to determine DVD comprises of the multi-layer when the detected count value is larger than the threshold value.

In the case of this video-game unit, since it causes the counting operation of the timer 7 to start with the timing is of the true pulse of the FcmpH signal and then the count value of the timer 7 is made to take in with the timing of the true pulse of the FcmpL signal to be used for determination whether the recording layer of the DVD 1 is the single-layer or the multi-layer, it is possible to execute determination of the recording layer of the DVD 1 accurately regardless of the presence or absence of generation of the false pulse.

In addition, since it is suitable that the threshold value for high level (FcmpH), the threshold value for low level (FcmpL) and the threshold value (ref), all of which are set with respect to the focus error signal and/or the RF signal, may be set in order to detect roughly the timing when the focus error signal and/or the RF signal appear, these threshold values are capable of being set to respective rough values without taking into consideration about setting of these threshold values. Therefore, although characteristic difference in every video-game unit, variation of reflectance in every DVD, change of received light amount caused by secular change of optical pickup, and so forth are generated, this makes it possible to execute determination whether the recording layer of the DVD 1 is the single-layer or the multi-layer accurately.

Second Embodiment

Next, a video-game unit to be the second embodiment of the present invention will be described.

In the case where movement control of the objective lens 32 of the optical pickup 2 is made from the Far position to the Near position, variation of movement speed of the objective lens 32 is generated due to variation of low band sensitivity of the actuator 31 of the optical pickup 2 in every respective units. In addition, variation of movement speed of the objective lens 32 is also generated due to magnetic force variation depending on temperature variation. For that reason, among respective units, variation of detection of the count value (T layer space) of the time corresponding to the above-described interlayer thickness is generated.

The video-game unit of the second embodiment detects the count value corresponding to the interlayer thickness (T layer space), and the count value corresponding to thickness (T substrate: substrate thickness) between the surface portion of the protection film and the surface portion of the recording layer of the DVD 1 when rise control of the objective lens 32 of the optical pickup 2 is made at constant speed.

The count value corresponding to the substrate thickness is detected in compliance with sensitivity If the actuator 31 of the optical pickup 2 For that reason, if the count value corresponding to the above interlayer thickness (T layer space) is compensated based on the detected substrate thickness and the standardized disc thickness, it is possible to normalize the count value corresponding to the interlayer thickness (T layer space) without being affected by sensitivity of the actuator 31, which enabling determination of the recording layer accurately based on the normalized count value.

The video-game unit of the second embodiment accurately determines whether the recording layer is the single-layer or the multi-layer based on the count value corresponding to the normalized interlayer thickness.

It should be noted that the above-described first embodiment is different in this point from the second embodiment. For this reason, only difference between the both embodiments will be explained in the following, thus duplicated descriptions are omitted.

Configuration of the Second Embodiment

Figure 11:
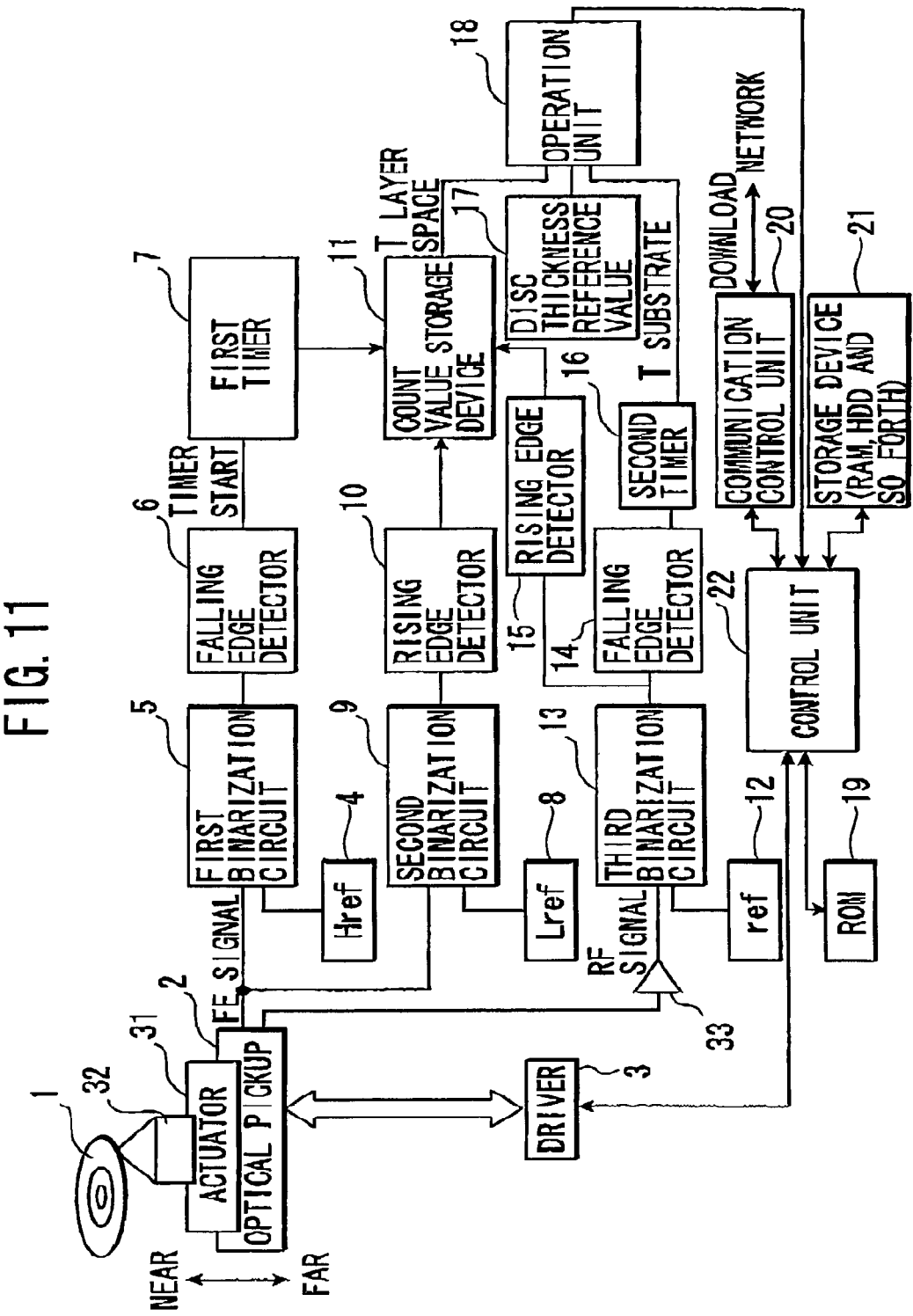
FIG. 11 is a block diagram of a video-game unit of a second embodiment to which the present invention is applied.

FIG. 11 shows a block diagram of principal portion of the video-game unit of the second embodiment. As shown in FIG. 11, the video-game unit of the second embodiment, in addition to the configuration of the video-game unit of the first embodiment, has a rising edge detector 15 for detecting a rising edge of the Discdet signal from the third binarization circuit 13 which executes the RP signal binarization, and a second timer 16 for performing counting of the time during period from timing when the rising edge of the Discdet signal is first detected to timing when the next rising edge of the Discdet signal is detected by the rising edge detector 15 and then outputting the count value as the value corresponding to the substrate thickness (T substrate) of the DVD 1.

In addition, the video-game unit has a disc thickness reference value output circuit 17 for outputting value of the disc thickness (disc thickness reference value) of the DVD 1 established according to the Standard, an operation unit 18 for performing calculation to normalize the interlayer thickness (T layer space) to be the count value from the count value storage device 11 based on the disc thickness reference value from the disc thickness reference value output circuit 17 and the count value (T substrate) indicating substrate thickness from the second timer 16, and the control unit 22 for determining whether the recording layer of the DVD 1 is the single-layer or the multi-layer based on the interlayer thickness normalized by the operation unit 18.

Determination Operation as to Whether Recording layer is Single-Layer or Multi-Layer Determination operation of the recording layer in the video-game unit having such configuration according to the second embodiment will be described. In the case of the video-game unit of the second embodiment, recording layer determinating process has a substrate thickness detection process performed at the rising edge detector 15 and the second timer 16, and a normalization process in which normalization processing is performed to the interlayer thickness output from the count value storage device 11.

Firstly, a flow of the substrate thickness detection process is described with reference to the flowchart in FIG. 12. The process of the flowchart starts with the timing when the control unit 22 of the video-game unit detects loading thereon of the DVD 1, where the substrate thickness detection process goes to STEP S11.

STEP S11 and STEP S12 are those corresponding to STEP S1 and STEP S2 of the flowchart of FIG. 6. Similarly to the above description, the control unit 22 performs lighting drive of the semiconductor laser of the optical pickup 2, and performs rise control of the objective lens 32 of the optical pickup 2 from the Far position to the Near position at constant speed.

According to the processing, the focus error signal and the RF signal are generated in the optical pickup 2, then the focus error signal is supplied to the first and the second binarization circuits 5, 9, while the RF signal is amplified by the amplifier 33 with the predetermined gain to be supplied to the third binarization circuit 13. Similarly to the above-described first embodiment, the count value (T layer space) indicating interlayer thickness of the DVD 1 is generated by the falling edge detector 6, the rising edge detector 10, the falling edge detector 14, the first timer 7 and the count value storage device 11 and the like based on the focus error signal and the RF signal. In the case of the second embodiment, the count value (T layer space) indicating the interlayer thickness is supplied to the operation unit 18.

The third binarization circuit 13 generates the above-described Discdet signal by binarizing the RF signal amplified by the amplifier 33 with the predetermined gain, and then supplies the Discdet signal to the falling edge detector 14 and the rising edge detector 15.

As described referring to FIG. 9 and FIG. 10, when the rise control of the objective lens 32 of the optical pickup 2 is performed from the Far position to the Near position, it is possible to obtain first the Discdet signal which becomes high level at the timing when the focus of the laser beam moves with respect to the protection film (disc surface) of the DVD 1 (FIG. 9: period between the time t31 and the time t32, FIG. 10: period between the time t41 and the time t42), secondly, it is possible to obtain the Discdet signal which becomes high level at the timing when the focus of the laser beam moves to the recording layer (signal surface) of the DVD 1 (FIG. 9: period between the time t33 and the time t34, FIG. 10: period between the time t43 and the time t44).

In the case of the DVD having the single-layer illustrated in FIG. 9, the time the Discdet signal which first becomes high level can be obtained is the time t31, while in the case of the DVD having the multi-layer (in the case of this example: two-layer) illustrated in FIG. 10, the time the Discdet signal which first becomes high level can be obtained is the time t41, where the rising edge detector 15 detects the rising edge of such Discdet signal and then supplies the detection output to the second timer 16.

STEP S13 of the flowchart in FIG. 12 indicates detection operation of the initial rising edge of the Discdet signal performed by the rising edge detector 15. The substrate thickness detection process goes to STEP S14 with the timing when the initial rising edge of the Discdet signal is detected by the rising edge detector 15.

In STEP S14, the second timer 16 starts counting of the time at the timing when the initial rising edge of the Discdet signal is detected by the rising edge detector 15.

When rise control of the objective lens 32 of the optical pickup 2 is continued, as indicated in the time t33 of FIG. 9 or the time t43 of FIG. 10, the Discdet signal having high level is obtained at the timing when the focus of the laser beam moves to the recording layer, where the rising edge detector 15 monitors presence or absence of the rising edge of this Discdet signal in STEP S15, and supplies the detection output to the second timer 16 at the timing when the rising edge detector 15 detects again the rising edge of the Discdet signal indicated in the time t33 of FIG. 9 or the rime E43 of FIG. 10. After this processing, the substrate thickness detection process goes to STEP S16.

In STEP S16, the second timer 16 stops counting of the time based on the detection output from the rising edge detector 15, and then supplies the count value to the operation section 18 as the count value corresponding to the substrate thickness (T substrate) of the DVD 1. According to this processing, the substrate thickness detection process indicated in the flowchart of FIG. 12 ends.

Namely, the second timer 16 starts counting of the time at the timing (FIG. 9: the time t13, FIG. 10: the time t41) of the rising edge of the Discdet signal having high level generated when the focus of the laser beam moves to the protection film of the DVD 1, and terminates counting of the time at the timing (FIG. 9: the time t33, FIG. 10: the time t43) of the rising edge of the Discdet signal having high level generated when the focus of the laser beam moves to the recording layer of the DVD 1.

The time period between the time t31 and the time t33 of FIG. 9 or the time period between the time t41 and the time t43 of FIG. 10 which is the time period from counting start to counting end in the second timer 16 is the necessary time that the focus of the laser beam moves over the distance corresponding to substrate thickness of the DVD 1 which is the distance from the surface portion of the protection film of the DVD 1 to the surface portion of the recording layer. For this reason, it is possible to detect particular movement characteristic for the actuator 31 of the optical pickup 2 by detecting (counting) the required time for this movement.

In the case of the video-game unit of the second embodiment, the count value corresponding to the interlayer thickness from the count value storage device 11 is compensated (normalized) based on the substrate thickness obtained in compliance with movement characteristic of the actuator 31 of the optical pickup 2 in the described-above and disc thickness of the DVD 1 established according to the standard.

Flowchart of FIG. 13 indicates flow of this normalization process. It should be noted that the flowchart of the normalization process shown in FIG. 13 is the one where STEP S21 to compensate (normalize) value of the interlayer thickness from the count value storage device 11 is added between STEP S8 and STEP S9 of the recording layer determination process in the first embodiment indicated in the flowchart of FIG. 6. Accordingly, in the flowchart of this FIG. 13, the same STEP numbers is assigned to STEP indicating the same operation as that of the flowchart of FIG. 6. Specifically, refer to description of the above-described flowchart of FIG. 6.

In the case of the flowchart of FIG. 13, in STEP S8, the count value (T layer space) indicating the interlayer thickness is supplied to the operation section 18 from the count value storage device 11, where the normalization process goes to STEP S21.

The operation section 18 is supplied with the count value (T layer space) indicating the interlayer thickness from the count value storage device 11, and the count value (T substrate) of the substrate thickness from the second timer 16, in addition those, the disc thickness reference value indicating disc thickness of the DVD 1 established according to the standard from the disc thickness reference value output circuit 17.

The operation section 18, in STEP S21, normalizes the count value (T layer spacer) indicating the interlayer thickness by performing operation of "normalized interlayer thickness"–"layer space"÷"T substrate"×"disc thickness reference value", based on the count value (T layer space) indicating the interlayer thickness, the count value (T substrate) corresponding to the substrate thickness, and the disc thickness reference value.

The control unit 22 which has a predetermined threshold value, determines that the DVD 1 has the multi-layer if the value of the normalized interlayer thickness is the same value as the threshold value or more, while the control unit 22 determines that the DVD 1 has the single-layer if the value of the normalized interlayer thickness is value lass than the threshold value.

Specific example will be indicated below.
Disc thickness reference value established according to the standard of DVD . . . "600 µm"
Interlayer thickness established according to the standard of DVD . . . "40 to 70 µm"
Count value of substrate thickness according to the second timer 16 . . . "35 msec"
Count value of interlayer thickness according to the first timer 7 . . . "300 µsec"
Normalized interlayer thickness=300 µsec ÷(35 msec× 1000)×600 µm≈5 µm As described above, the interlayer thickness is determined as "40 to 70 µm" according to the standard of the DVD, and the threshold value of, for example, "20 µm" is set to the control unit 22. Then, the normalized interlayer thickness is 5 µm. Accordingly, the control unit 22 determines that the currently loaded DVD 1 is the single-layer because of "20 µm (threshold value)>5 µm".

Similarly,
Disc thickness reference value established according to the standard of DVD . . . "600 µm"
Interlayer thickness established according to the standard of DVD . . . "40 to 70 µm"
Count value of substrate thickness according to the second timer 16 . . . "35 msec"
Count value of interlayer thickness according to the first timer 7 . . . "3200 µsec"
Normalized interlayer thickness 320 µsec÷(35 msec× 1000)×600 µm≈55 µm In this case, the normalized interlayer thickness is 55 µm. Accordingly, the control unit 22 determines that the currently loaded DVD 1 is the multi-layer because of "20 µm (threshold value)<55 µm".

Thus accurate determination of the recording layer allows compensation of variation in movement speed of the focus which is caused by variation of sensitivity of the actuator for driving the lens, due to the fact that determination of the recording layer is executed based on the normalized interlayer thickness.

It should be noted that, the control unit 22 performs setting control of respective portions based on the above-described determination result of the recording layer, while depending on type (single-layer or multi-layer) of the DVD, for example, whether or not adjustment of the gain for each signal from the optical pickup 2, or focus movement between recording layers should be executed (whether or not layer jump should be executed). This allows optimum record reproduction of information based on setting of respective portions corresponding to type of the DVD.

As is clear from the above description, the video game unit of the second embodiment is capable of normalizing the interlayer thickness (T layer space). For this reason, even although sensitivity variation of the actuator of the optical pickup is generated in every respective unit, it is possible to calculate the accurate interlayer thickness (T layer space) By using the normalized interlayer thickness (T layer space), it is possible to perform accurate determination as to whether the recording layer is the single-layer or the multi-layer, and to obtain the same effect as that of the above-described first embodiment.

Modified Example of Embodiment

It should be noted that in the above-described respective embodiments, movement control with respect to the objective lens 32 of the optical pickup 2 is performed from the Far position to the Near position at constant speed, however conversely, it is allowable that the movement control with respect to the objective lens 32 may be performed from the Near position to the Far position at constant speed.

In this case, a focus error signal having waveform appeared by reversing waveform of the focus error signal illustrated in FIG. 7 and FIG. 8 is obtained, in addition, also about the RF signal illustrated in FIG. 9 and FIG 10, firstly RF signal corresponding to the recording layer is obtained, secondly RF signal corresponding to the protection film is obtained.

For that reason, in this case, counting control of the timer 7 starts at the timing of the falling edge of the time t5, the time t23 of the FcmpL signal illustrated in FIG. 7, FIG. 8, and the count value of the timer 7 should be taken in at the timing of the rising edge of the time t4, the time t14 of the FcmpH signal This allows determination of the recording layer of the DVD 1 accurately in the same way as the above-described respective embodiments.

The above-described respective embodiments describe that the focus of the laser beam moves according to movement control of the objective lens 32, however, it is also allowable that the entire optical pickup 2 is controlled to move from t5 the Far position to the Near position (or from the Near position to the Far position), or the entire disk of DVD 1 itself is controlled to move in the direction along the optical axis Namely, it is possible to obtain the same effect as that of the above description by using means for moving the focus of the laser beam in the direction along the optical axis.

In the above-described respective embodiments, the interlayer thickness is detected based on the count value (T layer space) during period from the falling edge of the initial pulse of the FcmpH signal to the rising edge of the last pulse of the FcmpL signal, however, it is also allowable that detection of the interlayer thickness may be performed based on the count value during period from the rising edge of the initial pulse of the FcmpH signal to the falling edge of the last pulse of the FcmpL signal, or based on the count value during period, from intermediate timing during period from the rising edge to the falling edge of the initial pulse of the FcmpH signal, to intermediate timing during period from the rising edge to the falling edge of the last pulse of the FcmpL signal.

Furthermore, in the above-described respective embodiments, distance between the surface portion of the protection film and the surface portion of the recording layer of the DVD 1 is detected based on the count value (T substrate) during period from the rising edge of the initial pulse to the rising edge of the second pulse of the Discdet signal, however, it is also allowable that detection of distance between the surface portion of the protection film and the surface portion of the recording layer of the DVD 1 may be performed based on the count value during period from the falling edge of the initial pulse to the rising edge of the second pulse of the Discdet signal, or based on the count value during period, from intermediate timing during period from the rising edge to the falling edge of the first pulse, to intermediate timing during period from the rising edge to the falling edge of the second pulse.

Timing of both rising and falling of each pulse of the FcmpH signal, the FcmpL signal and the Discdet signal depends on level of the focus error signal and/or the RF signal, however, it is possible to perform averaging of error (relief of error) with respect to timing of the rising and/or the falling of respective pulses by using intermediate timing of the pulse, thereby enabling to detect more accurately the interlayer thickness or distance between the surface portion of the protection film and the surface portion of the recording layer of the DVD 1 without being affected by level of the focus error signal and/or the RF signal (It is possible to achieve improvement of detection accuracy.).

Furthermore, in the above-described respective embodiments, determination as to whether the recording layer is the single-layer or the multi-layer is performed based on the interlayer thickness (T layer space) however, it is also allowable that the number of the recording layer may be detected based on the detected interlayer thickness (T layer space).

Namely, since the inter layer thickness is determined according to the standard depending on the number of the recording layer, it is possible to detect the number of the recording layer by comparing the actually detected interlayer thickness (T layer space) with the value established according to the standard.

In addition, in the above-described respective embodiments, the time is counted by the first timer 7 and the second timer 16, however, it is also allowable that the number of a pulse having predetermined frequency may be counted. In this case, each time taken for the movement of the objective lens 32 which corresponds to the interlayer thickness (T layer space), or time taken for movement of the objective lens 32 which corresponds to the substrate thickness (T substrate) is detected as the count value of the number of the pulse.

Further, in the description of the above respective embodiments, the present invention is applied to the videogame unit having reproducing function of the DVD, however, the present invention may be applicable to another equipment such as, for instance, DVD player unit, DVD record/reproduce unit and the like, thus the present invention is applicable to whichever equipment capable of dealing with recording medium where respective layer constructions of the single-layer construction and the multi-layer construction exist.

The embodiments described in the above are only part of the examples of the present invention. It is therefore to be understood that the present invention may be practiced otherwise than as specifically described herein without departing from the scope and the spirit thereof.

13. The computer-readable recording medium having recorded therein a recording layer determination program to be executed on a computer according to claim 11 or 12, wherein the focus is moved so as to gradually approach the recording layer.

What is claimed is:

1. A recording layer determination apparatus comprising:
   a light irradiator that irradiates light to a recording medium;
   a scanning controller that scans the recording medium using a focus of the light in a direction of thickness;

a signal generator that generates at least a sum signal and a focus-error signal based on reflected light of the light obtained from the scanning;
a first threshold value setter that sets a first threshold value with respect to the sum signal;
a first pulse generator that generates a first pulse during a period of time in which a level of the sum signal becomes larger than the first threshold value;
a second threshold value setter that sets a second threshold value with respect to the focus-error signal, a level of the focus-error signal becoming larger than the second threshold value and then becoming smaller than the second threshold value when the focus of the light traverses one recording layer;
a second pulse generator that generates a second pulse during a period of time in which the level of the focus-error signal becomes larger than the second threshold value;
a third threshold value setter that sets a third threshold value which is smaller than the second threshold value with respect to the focus-error signal, the level of the focus-error signal becoming smaller than the third threshold value and then becoming larger than the third threshold value when the focus of the light traverses said one recording layer;
a third pulse generator that generates a third pulse during a period of time in which the level of the focus-error signal becomes smaller than the third threshold value;
a period determinator that determines a detection period of a recording layer based on the first pulse;
an interval determinator that in the detection period specifies an initial generated second pulse and a last generated third pulse, and determines an interval from a time at which the specified second pulse is formed until a time at which the specified third pulse is formed, or specifies an initial generated third pulse and a last generated second pulse, and determines an interval from a time at which the specified third pulse is formed until a time at which the specified second pulse is formed; and
a recording layer determinator that determines that the recording medium is a single layer type having a single the single recording layer when a value of the interval is smaller than a predetermined value, while determining that the recording medium is a multiple layers type having a plurality of recording layers when the value of the interval is larger than the predetermined value.

2. The recording layer determination apparatus according to claim 1, wherein the scanning controller moves the focus at constant speed.

3. The recording layer determination apparatus according to claim 1, wherein the scanning controller moves the focus so as to gradually approach the recording layer.

4. The recording layer determination apparatus according to claim 1, wherein the interval determinator determines:
in the detection period, an interval during a period from a falling edge of the initial second pulse to a rising edge of the last third pulse,
an interval during a period from a falling edge of the initial third pulse to a rising edge of the last second pulse, or
an interval from an intermediate time during a period from a rising edge to the falling edge of the initial second pulse, to an intermediate time during a period from the rising edge to a falling edge of the last third pulse.

5. A recording layer determination method comprising the steps of:
irradiating light to a recording medium;
scanning the recording medium using a focus of the light in a direction of thickness;
generating at least sum signal and focus-error-signal based on reflected light of the light obtained from the scanning;
setting a first threshold value with respect to the sum signal;
generating a first pulse during period of time a level of the sum signal becomes larger than the first threshold value;
setting a second threshold value with respect to the focus-error-signal;
generating a second pulse during period of time a level of the focus-error-signal becomes larger than the second threshold value;
setting a third threshold value which is smaller than the second threshold value with respect to the focus-error-signal;
generating a third pulse during period of time a level of the focus-error-signal becomes smaller than the third threshold value;
determining a detection period of recording layer based on the first pulse; one of:
specifying in the detection period an initial generated second pulse and a last generated third pulse, and determining an interval from a time when the specified second pulse is formed until a time when the specified third pulse is formed, and
specifying in the detection period an initial generated third pulse and a last generated second pulse, and determining an interval from a time when the specified third pulse is formed until a time when the specified second pulse is formed; and
determining the recording medium has a single-layer when a value of the interval is smaller than a predetermined value, while determining the recording-medium has a multi-layer when the value of the interval is larger than the predetermined value.

6. The recording layer determination method according to claim 5, wherein the focus is moved at constant speed.

7. The recording layer determination method according to claim 5, wherein the focus is moved so as to gradually approach the recording layer.

8. A computer-readable recording medium having recorded therein a recording layer determination program to be executed on a computer, the program enabling a method comprising the steps of:
irradiating light to a recording medium;
scanning the recording medium using a focus of the light in a direction of thickness;
generating at least sum signal and focus-error-signal based on reflected light of the light obtained from the scanning;
setting a first threshold value with respect to the sum signal;
generating a first pulse during period of time a level of the sum signal becomes larger than the first threshold value;
setting a second threshold value with respect to the focus-error-signal;
generating a second pulse during period of time a level of the focus-error-signal becomes larger than the second threshold value;

setting a third threshold value which is smaller than the second threshold value with respect to the focus-error-signal;

generating a third pulse during period of time a level of the focus-error-signal becomes smaller than the third threshold value; determining a detection period of recording layer based on the first pulse; one of:

specifying in the detection period an initial generated second pulse and a last generated third pulse, and determining an interval from a time when the specified second pulse is formed until a time when the specified third pulse is formed, and specifying in the detection period an initial generated third pulse and a last generated second pulse, and determining an interval from a time when the specified third pulse is formed until a time when the specified second pulse is formed; and determining the recording medium has a single-layer when a value of the interval is smaller than a predetermined value, while determining the recording-medium has a multi-layer when the value of the interval is larger than the predetermined value.

9. The computer-readable recording medium having recorded therein a recording layer determination program to be executed on a computer according to claim 8, wherein the focus is moved at constant speed.

10. The computer-readable recording medium having recorded therein a recording layer determination program to be executed on a computer according to claim 8, wherein the focus is moved so as to gradually approach the recording layer.

11. A computer readable medium storing a recording layer determination program to be executed on a computer, the computer provided for a recording layer determination apparatus having a light irradiator that irradiates light to a recording medium and a scanning controller that scans the recording medium using a focus of the light in a direction of thickness, comprising the steps of:

generating at least a sum signal and a focus-error-signal based on reflected light of the light obtained from the scanning;

setting a first threshold value with respect to the sum signal;

generating a first pulse during a period of time in which a level of the sum signal becomes larger than the first threshold value;

setting a second threshold value with respect to the focus-error-signal, a level of the focus-error signal becoming larger than the second threshold value and then becoming smaller than the second threshold value when the focus of the light traverses one recording layer;

generating a second pulse during a period of time in which the level of the focus-error-signal becomes larger than the second threshold value;

setting a third threshold value which is smaller than the second threshold value with respect to the focus-error-signal, the level of the focus-error signal becoming smaller than the third threshold value and then becoming larger than the third threshold value when the focus of the light traverses said one recording layer;

generating a third pulse during period of time a level of the focus-error-signal becomes smaller than the third threshold value;

determining a detection period of recording layer based on the first pulse; one of:

specifying in the detection period an initial generated second pulse and a last generated third pulse, and determining an interval from a time when the specified second pulse is formed until a time when the specified third pulse is formed, and specifying in the detection period an initial generated third pulse and a last generated second pulse, and determining an interval from a time when the specified third pulse is formed until a time when the specified second pulse is formed; and determining the recording medium is a single-layer type having the single recording layer when a value of the interval is smaller than a predetermined value, while determining the recording-medium is a multi-layer type having a plurality of the recording layers when the value of interval is larger than the predetermined value.

12. The recording layer determination apparatus according to claim 1, wherein:

the interval determinator detects a first time when the second pulse is generated initially and a second time when the third pulse is generated sequentially after the detection period has been started, and specifies the initial second pulse based on the detected first time and the last third pulse based on the detected second time when the third pulse is generated immediately before the detection period is ended, or detects a third time when the third pulse is generated initially and a fourth time when the second pulse is generated sequentially after the detection period has been started, and specifies the initial third pulse based on the detected third time and the last second pulse based on the detected fourth time when the second pulse is generated immediately before the detection period is ended.

13. The recording layer determination apparatus according to claim 12, wherein the interval determinator comprises:

a timer which starts counting time at the detected first time, a storage means for storing a count value of the time from the timer at the detected second time sequentially, and a supplying means for supplying the count value of the time which is stored immediately before the detection period is ended as the value of the interval from the storage means to the recording layer determinator.

14. The recording layer determination apparatus according to claim 12, wherein the interval determinator comprises:

a timer which starts counting of time at the detected third time, a storage means for storing a count value of the time from the timer at the detected fourth time sequentially, and a supplying means for supplying the count value of the time which is stored immediately before the detection period is ended as the value of the interval from the storage means to the recording layer determinator.

* * * * *